United States Patent [19]

Münzamy et al.

[11] Patent Number: 5,338,763
[45] Date of Patent: Aug. 16, 1994

[54] PROCESS FOR THE PREPARATION OF COMPOUNDS CONTAINING HYDROXYL GROUPS AND THEIR USE IN THE PRODUCTION OF POLYURETHANE RESINS

[75] Inventors: Thomas Münzamy, Dormagen; Werner Rasshofer, Cologne; Karl-Heinz Dörner, Pulheim; Ulrich Limna, Monheim, all of Fed. Rep. of Germany

[73] Assignee: Bayer Aktiengesellschaft, Leverkusen, Fed. Rep. of Germany

[21] Appl. No.: 986,167

[22] Filed: Dec. 4, 1992

[30] Foreign Application Priority Data

Dec. 12, 1991 [DE] Fed. Rep. of Germany ....... 4140967

[51] Int. Cl.$^5$ .............................................. C08J 11/04
[52] U.S. Cl. .................. 521/49.5; 252/182.2; 252/182.24; 521/49; 525/452; 525/457; 525/458; 525/459; 525/460; 528/85; 568/700
[58] Field of Search ......... 252/182.2, 182.24; 528/85; 568/700; 521/49.5, 49; 525/452, 457, 458, 459, 460

[56] References Cited

U.S. PATENT DOCUMENTS 3,738,946 6/1973 Frulla et al. .............. 521/49.5
4,316,992 2/1982 Gerlock et al. ............ 521/49.5

FOREIGN PATENT DOCUMENTS 4024601 5/1991 Fed. Rep. of Germany .

*Primary Examiner*—John Kight, III
*Assistant Examiner*—John M. Cooney, Jr.
*Attorney, Agent, or Firm*—Joseph C. Gil; Lyndanne M. Whalen

[57] ABSTRACT

Compounds containing alcoholic hydroxyl groups suitable as a starting material for the isocyanate polyaddition process by the alcoholysis of polyisocyanate polyaddition products are produced. Polyurethane urea or polyurea waste products having a molar ratio of urea groups to urethane groups of from 1:20 to 1:0 are heated in size reduced form to temperatures of from 120° to 250° C. together with B) polyhyhdric alcohols in the molecular weight range of from 62 to 250 in a ratio by weight of A:B of from 3:1 to 1:10. At least 10% of the polyhydric alcohol B put into the process is subsequently removed by distillation under reduced pressure. A total of up to 1000% by weight, based on the weight of polyurethane urea or polyurea waste A, of one or more polyhydroxy compounds having a molecular weight above 250 which is (are) not volatile under the distillation conditions may optionally be added to the mixture before and/or after removal of the excess alcohol B by distillation. The resulting compounds containing hydroxyl groups may be used as starting material for the production of polyurethane resins by the isocyanate polyaddition process.

9 Claims, No Drawings

PROCESS FOR THE PREPARATION OF COMPOUNDS CONTAINING HYDROXYL GROUPS AND THEIR USE IN THE PRODUCTION OF POLYURETHANE RESINS

BACKGROUND OF THE INVENTION

The present invention relates to a process for the preparation of compounds containing hydroxyl groups from polyurethane urea or polyurea waste products and their use in the production of polyurethane resins.

It is known that synthetic resins produced by the polyisocyanate polyaddition process, in particular foams, can be broken up into low molecular weight components by suitable reactive solvents and converted into a soluble form. One of these methods is alcoholysis, in particular glycolysis, in which polyhydric alcohols, in particular glycols, are used to decompose polyisocyanate polyaddition products and dissolve the products of decomposition. Publications describing such processes include: DE 1,110,405; DE 2,238,109; DE 2,304,444; DE 2,414,091; DE 2,516,863; DE 2,557,172; DE 2,738,572; DE 2,759,054; DE 2,902,509; DE 3,702,495; U.S. Pat. No. 3,109,824; 3,404,103; 3,632,530; 3,983,087; 3,738,946; 3,632,530; 3,300,417; 2,937,151; 4,014,809; 4,110,266; 4,159,972; 4,162,995; EP 11,661 and EP 105,167.

EP-A-11,661 discloses a process for decomposing flexible polyurethane foams, according to which a relatively high molecular weight, non-distillable polyhydroxyl compound is incorporated with the reaction mixture after glycolysis. At least part of the glycol still present is then removed by distillation.

The above-listed publications do not, however, provide a solution to the problem of decomposition of polyurethane urea or polyurea waste products by alcoholysis to recover useful products. Nor do these disclosures address the particular problem of working up synthetic resins produced from polyisocyanate mixtures of the diphenylmethane series and aromatic diamine chain lengthening agents.

Only DE-PS 4,024,601 deals with the problem of converting polyisocyanate polyaddition products prepared by the RIM process to useful starting materials. According to this disclosure, the reaction with low molecular weight polyhydric alcohols is carried out with a ratio by weight of synthetic resin to alcohol of at least 3:1 and is followed by mixing of the products of alcoholysis with so-called primary polyols to form stable dispersions of high viscosity.

The high viscosity of the products of the process of DE-PS 4,024,601 is a disadvantage which makes it difficult to use high proportions of the products of alcoholysis for reprocessing by the polyisocyanate polyaddition process. Reprocessing which makes it possible to almost completely reuse the scrap synthetic resin would, of course, be desirable. Attempts to reduce the viscosity of the end product of the alcoholysis by employing higher reaction temperatures and/or longer reaction times for alcoholysis resulted in the reaction product containing an undesirably high proportion of diamines corresponding to the diisocyanates which had been incorporated into the scrap resin.

SUMMARY OF THE INVENTION

It is an object of the present invention to provide a new process for the preparation of compounds containing hydroxyl groups from polyurethane ureas or polyureas.

It is also an object of the present invention to provide a process for the degradation of synthetic polyurethane or polyurea resins by alcoholysis which yields products having a substantially reduced viscosity and containing only a small proportion of free diamines.

It is a further object of the present invention to provide a process for producing polyisocyanate addition products from scrap polyurethane or polyurea.

These and other objects which will be apparent to those skilled in the art are accomplished by heating polyurethane or polyurea waste in size reduced form and a polyhydric alcohol having a molecular weight of from about 62 to about 250 to a temperature of from about 120° to about 250° C. and distilling this mixture under reduced pressure to remove at least 10% by weight of the polyhydric alcohol. A polyhydroxyl compound having a molecular weight above 250 may optionally be included in the mixture. The ratio of polyurethane or polyurea waste to low molecular weight (i.e., from about 62 to 250) polyhydric alcohol is generally from 3:1 to 1:10.

DETAILED DESCRIPTION OF THE INVENTION

This invention relates to a process for the preparation of compounds containing alcoholic hydroxyl groups suitable as starting materials for the isocyanate polyaddition process. These starting materials are produced by the alcoholysis of polyisocyanate polyaddition products at elevated temperatures followed by distillative working up of the product of alcoholysis. In this process, (A) polyurethane urea or polyurea waste products in which the molar ratio of urea groups to urethane groups is from 1:20 to 1:0 are heated in size reduced form to temperatures of from 120° to 250° C. together with (B) polyhydric alcohols in the molecular weight range of from about 62 to about 250 while maintaining a ratio by weight of (A):(B) of from 3:1 to 1:10 to form a homogeneous liquid reaction mixture. At least 10% of the polyhydric alcohol (B) put into the process is subsequently removed by distillation under reduced pressure so that the distillation residue contains a residue of free polyhydric alcohol (B) of at most 50% by weight, not taking into account any component (C) added.

The reaction mixture may also optionally include (C) a total of up to 1000% by weight, based on the weight of starting component (A), of at least one polyhydroxyl compound having a molecular weight above 250 which is non-volatile under the distillation conditions. Component (C) may be added before and/or after the distillative removal of the excess alcohol (B).

The present invention also relates to the use of the hydroxyl group-containing compounds obtained by this process as starting material for the production of polyurethane and/or polyurea resins by the isocyanate polyaddition process.

The process of the present invention has the following particular advantages compared with the processes known in the art:

1. Alcoholysis of the polyurethane urea and/or polyurea resin waste products can be carried out at relatively low temperatures.

2. Short reaction times are possible in spite of the reduced reaction temperatures.

3. The amount of low molecular weight, polyhydric alcohol (B) required is relatively small.

4. The resulting compounds containing hydroxyl groups are distinguished by an exceptionally low proportion of aromatic amines. They are suitable for many applications, in particular for the production of molded products based on polyurethanes by the reaction injection molding technique with hardly any loss in properties (when compared with the corresponding synthetic resins based on "primary polyols", i.e. based on fresh compounds directly obtained from polyol production).

Suitable starting materials (A) are polyurethane ureas or polyureas in which the molar ratio of urea groups to urethane groups is from about 1:20 to 1:0, preferably from about 2:1 to 1:0 and most preferably from about 5:1 to 1:0. Particularly preferred starting materials (A) are molded synthetic resins in the density range of from 0.8 to 1.4 g/cm$^3$, preferably from 1.0 to 1.3 g/cm$^3$ conforming to these particulars and produced by the reaction injection molding technique.

Specific examples of such starting materials include: synthetic resin moldings produced in accordance with the process disclosed in DE-OS 3,133,859 in which (i) liquid polyisocyanate mixtures based on 4,4'-diisocyanatodiphenylmethane and/or its isomers and/or higher homologues, (ii) relatively high molecular weight polyether polyols in the molecular weight range of from 2000 to 8000 preferably having primary hydroxyl groups and a hydroxyl functionality of from 2 to 4 and (iii) chain-lengthening mixtures consisting of low molecular weight diols (in particular ethylene glycol) and sterically hindered aromatic diamines (particularly 1-methyl-3,5-diethyl- 2,4-aminobenzene or commercial mixtures thereof with 1-methyl-3,5-diethyl-2,6-diaminobenzene) in a ratio by weight of diol:diamine of from 55:45 to 95:5 were used as starting materials. The molar ratio of urea groups to urethane groups in these synthetic resins is below 1:1. Molded products produced by the process disclosed in U.S. Pat. No. 4,218,543 mainly without alcoholic chain lengthening agents are also suitable as starting materials in the present invention. In these molded products, the molar ratio of urea groups to urethane groups is above 2:1, in most cases above 5:1.

Molded synthetic resins based on polyureas produced in accordance with EP-A-0,081,701 (U.S. Pat. No. 4,774,263) may also be used in the process of the present invention as a starting material. These synthetic resin products are produced from (i) polyisocyanates based on 4,4'-diphenylmethane diisocyanate, aminopolyethers having a molecular weight in the range of from 1800 to 12,000 having terminal primary, aliphatically or aromatically bound amino groups and aromatic diamines commonly used as chain-lengthening agents. In these molded products the molar ratio of urea groups to urethane groups is virtually 1:0. Molded synthetic resins produced in accordance with the process disclosed in DE-PS 3,827,595 are also suitable for the process of the present invention. These molded products are also produced by reaction injection molding. In this disclosed process, isocyanate semi-prepolymers obtained from (i) 4,4'-diisocyanato diphenylmethane or mixtures thereof with its isomers and/or higher homologues and (ii) polyether polyols are reacted with aromatic diamines. In these synthetic resins, the molar ratio of urea groups to urethane groups is generally above 5:1.

In the molded synthetic resins which are particularly preferred as starting components (A) in the process of the present invention, the usual fillers and reinforcing materials, auxiliary agents and additives described in the above-mentioned prior publications may be used. Molded synthetic resins containing glass fibers as fillers are among the most preferred starting materials (A).

The starting materials (A) are used in size reduced form, preferably in granulated form, most preferably with a maximum average particle diameter of 5 mm.

The polyhydric alcohol (B) used in the process of the present invention has a molecular weight in the range of from about 62 to about 250. Mixtures of such alcohols may also be used. Specific examples of suitable alcohols include: ethylene glycol, diethylene glycol, tri- and tetraethylene glycol, propylene glycol, di-, tri- and tetrapropylene glycol, 1,3-propylene glycol, di-, tri- and tetra-1,3-propylene glycol and higher valent alcohols such as glycerol, trimethylolpropane, trimethylolethane and/or pentaerythritol. Diethylene glycol and dipropylene glycol are preferred.

The polyhydroxyl compounds (C) which may optionally be used are compounds which are not distillable under the conditions of the process according to the invention. Polyether polyols having a molecular weight above 250 are preferred. The polyether polyols in the molecular weight range of from 1800 to 12000 used as starting materials in the process disclosed in U.S. Pat. No. 4,218,543 are particularly preferred.

In the process of the present invention, components (A) and (B) are used in quantities such that the ratio by weight of (A):(B) is from about 3:1 to 1:10, preferably from about 1.5:1 to 1:5. The quantity of component (B) should provide a 100% molar excess of hydroxyl groups from component (B) to urea and urethane groups of component (A).

If optional component (C) is used, it is used in quantities of up to 1000% by weight, preferably up to 200% by weight, based on the weight of component (A).

The alcoholysis of the present invention is generally carried out in the temperature range of from about 120° to 250° C., preferably from about 160° to 220° C., under normal pressure.

The removal by distillation of at least part of component (B) which is used in excess is generally carried out at a pressure of from 1 to 50 mbar at temperatures of from 100° to 160° C.

The process of the present invention may be carried out by various methods. Common to each of these methods is the at least partial removal by distillation of the low molecular weight polyol (B) put into the process in excess after termination of the alcoholysis reaction. This removal is done in a manner such that the distillation residue has a residual low molecular weight alcohol content (B), not counting any component (C) used, of up to 50% by weight, preferably from 0 to 20% by weight, most preferably from 5 to 15% by weight.

There are several specific methods which may be used to carry out the process of the present invention. In one method, low molecular weight polyol (B) and polyurea and/or polyurethane urea waste (A) are introduced into the reaction vessel and then heated to the reaction temperature. After complete liquefication of the reaction mixture, the low molecular weight polyol (B) is at least partly distilled off. Relatively high molecular weight primary polyols (C) may be added to the reaction mixture before or after distillation, depending on the properties required.

In another useful method, the low molecular weight polyol (B) is heated to the reaction temperature and the polyurea and/or polyurethane urea waste (A) is added continuously or portionwise. After complete liquefication of the reaction mixture, the low molecular weight polyol (B) is at least partly distilled off. Relatively high molecular weight primary polyols (C) may be added to the reaction mixture before or after distillation, depending on the required properties.

Another method for carrying out the process of the present invention which is particularly advantageous is to conduct the reaction on a continuous basis in a heatable screw extruder and to distill off the low molecular weight polyol (B) in an apparatus arranged downstream of the extruder.

The products of the process of the present invention are compounds containing hydroxyl groups whose consistency at room temperature ranges from low viscosity liquid to (in the absence of polyol (C)) solid. They are preferably liquids having a viscosity at 25° C. of from 1000 to 20,000 mPa.s but differing from products of the process according to DE-PS 4,024,601 in having a substantially lower viscosity when produced from starting materials of a comparable composition. The products of the process of the present invention contain a very small residue, amounting to at most 1.5% by weight, preferably not more than 1.1% by weight, of sterically unhindered diamine corresponding to the polyisocyanate used. When unpigmented starting materials (A) are used, the products of the process according to the invention generally have a yellowish brown color.

When starting materials (A) containing fillers and/or reinforcing materials are used, they are generally present in a finely dispersed form in the products of the process.

The products of the process of the present invention may easily be adapted to the intended uses by varying the nature and quantitative ratios of the starting materials, in particular the nature and quantity of component (C). These compounds containing alcoholic hydroxyl groups are suitable of use as polyol components in the production of polyurethane ureas by the reaction injection molding technique. Suitable reaction injection molding techniques are disclosed in the above-described prior art.

Having thus described our invention, the following Examples are given as being illustrative thereof. All percentages given in these Examples are percentages by weight.

EXAMPLES

Starting materials

Polyurethane urea A1

A granulate having a maximum particle size of 3 mm of glass fiber reinforced polyurethane urea having a density of 1.26 g/cm$^3$ prepared by the same procedure from the same materials described in Example 3 of DE-PS 2,622,951. The molar ratio of urea:urethane was 2.3:1.

Polyether polyol CI

Polyether polyol with OH number 36 prepared by the propoxylation of trimethylolpropane followed by ethoxylation of the product of propoxylation (PO:EO ratio by weight: 83:17).

Polyether polyol CII

Polyether polyol with OH number 28 prepared by the propoxylation of trimethylolpropane followed by ethoxylation of the product of propoxylation (PO:EO ratio by weight=83:17).

EXAMPLE 1

500 g of Diethylene glycol (DEG) were introduced at 200° C. into a 3.6 liter surface ground vessel equipped with stirrer and heating jacket. 500 g of the granulated polyurethane urea A1 (maximum particle size about 3 mm) were added in 5 portions within 40 minutes. The temperature was maintained at 200° C. for an additional 10 minutes. A homogeneous reaction mixture was obtained at the end of this time. 400 g of diethylene glycol were distilled off at a pressure of 5 mbar and at a temperature of from 130° to 140° C. A mass which solidified at room temperature, melted at 80° C. and was miscible with relatively high molecular weight primary polyols C was obtained.

OH number: 175 mg KOH/g
NH$_2$ groups: 0.58%
Free diethylene glycol content: 7.3%
Free sterically unhindered polyamine content: 0.7%.

EXAMPLE 2

500 g of DEG and 500 g of the granulated starting material A1 were mixed at room temperature in a 3.6-liter surface-ground vessel equipped with stirrer and heating jacket and heated to 200° C. A homogeneous reaction product was obtained after 30 minutes at 200° C. A homogeneous pasty reaction product which was readily miscible with relatively high molecular weight polyols C at 80° C. was obtained after the removal of 400 g of DEG by distillation.

OH number: 170 mg KOH/g
NH$_2$ groups: 0.73%
Free diethylene glycol content: 6.8%
Sterically unhindered polyamine content: 0.9%.

EXAMPLE 3

500 g of DEG and 500 g of the granulated starting material A1 were mixed at room temperature in a 3.6-liter surface-ground vessel equipped with stirrer and heating jacket and heated to 200° C. A homogeneous reaction product was obtained after 30 minutes at 200° C. The product was cooled to 150° C. and 500 g of polyether polyol C1 were added. After the removal of 400 g of DEG by distillation, a homogeneous product with OH number 117 mg KOH/g, an NH$_2$ group content of 1.07%, a free diethylene glycol content of 4.5% and a sterically unhindered polyamine content of 0.5% was obtained. The viscosity of the product was 2300 mPa.s (25° C.).

EXAMPLE 4

500 g of dipropylene glycol (DPG) and 500 g of the granulated starting material A1 were mixed at room temperature in a 3.6-liter surface-ground vessel equipped with stirrer and heating jacket and heated to 200° C.

A homogeneous reaction product was obtained after 3 hours at 200° C. 500 g of Polyether polyol C2 were added after the product had cooled to 150° C. and 400 g of DPG were then distilled off. A homogeneous product having an OH number of 166 mg KOH/g, a viscosity of 5000 mPa.s at 25° C., a primary amino group content of 1.09%, a free DPG content of 5.2% and 0.9% of free, sterically unhindered diamine was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of compounds containing alcoholic hydroxyl groups comprising
   1) heating to a temperature of from about 120° to about 250° C. a mixture of
      (A) a size reduced polyurethane urea or polyurea waste in which the molar ratio of urea groups to urethane groups is from 1:20 to 1:0 with
      (B) a polyhydric alcohol having a molecular weight in the range of from 62 to 250
      (C) up to 1000% by weight based on the weight of (A), of at least one polyhydroxyl compound having a molecular weight above 250 which is non-volatile under distillation conditions in a ratio by weight of (A):(B) of from 3:1 to 1:10 to form a homogeneous liquid reaction mixture,
   2) distilling the homogeneous mixture from 1) at reduced pressure to remove at least 10% of the polyhydric alcohol (B), so that the residue of the distillation has a content of free polyhydric alcohol (B) of at most 50% by weight, exclusive of any component (C) present, and
   3) optionally, adding up to 1000% by weight, based on the weight of starting component (A), of at least one polyhydroxyl compound having a molecular weight above 250 which is nonvolatile under distillation conditions to the distillation residue.

2. The process of claim 1 in which component (A) is a synthetic resin based on polyurethane urea or polyurea having a density in the range of from 0.8 to 1.4 g/cm$^3$ produced by reaction injection molding.

3. The process of claim 2 in which component (A) has a molar ratio of urea groups to urethane groups of from 2:1 to 1:0.

4. The process of claim 2 in which component (A) contains a filler and/or reinforcing material.

5. The process of claim 1 in which component (A) has a molar ratio of urea groups to urethane groups of from 2:1 to 1:0.

6. The process of claim 1 in which component (B) is used in a quantity such that the ratio by weight of (A):(B) is from about 1.5:1 to about 1:5.

7. The process of claim 1 in which excess polyhydric alcohol (B) is removed in distillation 2) in an amount such that the distillation residue contains from 0 to 20% by weight polyhydric alcohol (B), exclusive of any component (C) optionally added after step 1).

8. The process of claim 1 in which component (C) is used in a quantity of up to 200% by weight, based on the weight of starting component (A).

9. A process for the production of a polyisocyanate addition product comprising reacting the compound containing alcoholic hydroxyl groups of claim 1 with a polyisocyanate.

* * * * *

UNITED STATES PATENT AND TRADEMARK OFFICE
CERTIFICATE OF CORRECTION

PATENT NO. : 5,338,763
DATED : August 16, 1994
INVENTOR(S) : Thomas Münzmay et al It is certified that error appears in the above-indentified patent and that said Letters Patent is hereby corrected as shown below:

On the title page, item [75]:

In the listing of Inventors, delete "Thomas Münzamy" and insert therefor --Thomas Münzmay--; delete "Ulrich Limna" and insert therefor --Ulrich Liman--.

Signed and Sealed this

Thirteenth Day of December, 1994

Attest:

BRUCE LEHMAN

Attesting Officer     Commissioner of Patents and Trademarks